United States Patent
Mangipudi

(10) Patent No.: US 7,849,050 B2
(45) Date of Patent: Dec. 7, 2010

(54) APPARATUS AND METHOD FOR ANALYZING IMPACT AND LINEAGE OF MULTIPLE SOURCE DATA OBJECTS

(75) Inventor: Suryanarayana Mangipudi, Sunnyvale, CA (US)

(73) Assignee: Business Objects Data Integration, Inc., San Jose, CA (US)

( * ) Notice: Subject to any disclaimer, the term of this patent is extended or adjusted under 35 U.S.C. 154(b) by 251 days.

(21) Appl. No.: 11/668,418

(22) Filed: Jan. 29, 2007

(65) Prior Publication Data

US 2008/0183658 A1    Jul. 31, 2008

(51) Int. Cl.
*G06F 17/30* (2006.01)

(52) U.S. Cl. ........................ 707/602; 707/603

(58) Field of Classification Search .............. None
See application file for complete search history.

(56) References Cited

U.S. PATENT DOCUMENTS

| | | | |
|---|---|---|---|
| 2001/0034733 A1* | 10/2001 | Prompt et al. ............ | 707/102 |
| 2003/0023608 A1 | 1/2003 | Egilsson et al. | |
| 2004/0153469 A1 | 8/2004 | Keith-Hill | |
| 2005/0149484 A1 | 7/2005 | Fox et al. | |
| 2006/0069717 A1 | 3/2006 | Mamou et al. | |
| 2006/0265489 A1 | 11/2006 | Moore | |

OTHER PUBLICATIONS

Klettke et al., "XML and Object-Relational Database Systems—Enhancing Structural Mappings Based on Statistics," In: Lecture Notes In Computer Science from the Third International Workshop WebDB 2000 on The World Wide Web and Databases [online], published May 18, 2000 [retrieved on Jun. 28, 2008], pp. 151-170, vol. 1997. Retrieved from the Internet: <URL: http://www.informatik.uni-rostock-de/~meike/webdb2000.ps.gz>.

International Search Report and Written Opinion for International Application No. PCT/US2008/052169, mailed on Jul. 14, 2008, 6 pages.

Almeida et al., "Getting Started with Data Warehouse and Business Intelligence", http://pk.dobrich.net/CRM-Dobrich/WDWBI.pdf, Aug. 1999, 260 pages.

* cited by examiner

*Primary Examiner*—Mohammad Ali
*Assistant Examiner*—Syed H Hasan
(74) *Attorney, Agent, or Firm*—Cooley LLP

(57) ABSTRACT

A computer readable storage medium includes executable instructions to list flattened single source object relationships in a first segment of a multiple source relationship table. Same-as multiple source object relationships are calculated. Same-as multiple source object relationships are then populated in a second segment of the multiple source relationship table.

11 Claims, 5 Drawing Sheets

| Context Type | Context | Database | Catelog | Schema | = | Context | Database | Catelog | Schema | Description |
|---|---|---|---|---|---|---|---|---|---|---|
| RDBMS type | MS SQL | * | * | dbo | = | MS SQL | * | * | sa | In MS-SQL *dbo* and *sa* are same |
| System | BI | BIDB | * | * | = | ETL | ETLDB | * | * | For Oracle connections BIDB and ETLDB are the same |
| Any | * | * | BOMM | * | = | * | * | DI | * | States that BOMM and DI are same |

FIG. 3

APPARATUS AND METHOD FOR ANALYZING IMPACT AND LINEAGE OF MULTIPLE SOURCE DATA OBJECTS

CROSS-REFERENCE TO RELATED APPLICATION

This application is related to the concurrently filed and commonly owned application entitled "Apparatus and Method for Analyzing Relationships between Multiple Source Data Objects", Ser. No. 11/668,404, filed Jan. 29, 2007.

BRIEF DESCRIPTION OF THE INVENTION

This invention relates generally to information processing. More particularly, this invention relates to identifying and utilizing common objects distributed across multiple data sources.

BACKGROUND OF THE INVENTION

Metadata is data that characterizes data. Metadata exists in many different places within an enterprise. Current systems to capture metadata tend to focus on metadata related to a specific segment of metadata within an organization. For example, independent silos of metadata are often created by databases, modeling tools, Extract Transform Load (ETL) tools, and Business Intelligence tools. These tools lead to a proliferation of metadata, duplicate metadata, and different representations of the metadata. To overcome this problem, products have been introduced to integrate metadata into a single metadata repository. Thus, a single metadata repository includes metadata from various data sources. However, there are still ongoing challenges to using this metadata in an effective manner. That is, there are ongoing challenges in processing metadata in a metadata repository so as to find relationships between objects in the metadata repository. In addition, there are ongoing challenges to effectively characterizing the impact and lineage of objects in a metadata repository.

In view of the foregoing, it would be desirable to provide improved techniques for processing metadata in a metadata repository.

SUMMARY OF THE INVENTION

The invention includes a computer readable storage medium with executable instructions to list flattened single source object relationships in a first segment of a multiple source relationship table. Same-as multiple source object relationships are calculated. Same-as multiple source object relationships are then populated in a second segment of the multiple source relationship table.

BRIEF DESCRIPTION OF THE FIGURES

The invention is more fully appreciated in connection with the following detailed description taken in conjunction with the accompanying drawings, in which:

FIG. 3 illustrates relationship rules utilized in accordance with an embodiment of the invention.

Like reference numerals refer to corresponding parts throughout the several views of the drawings.

DETAILED DESCRIPTION OF THE INVENTION

Figure 1:
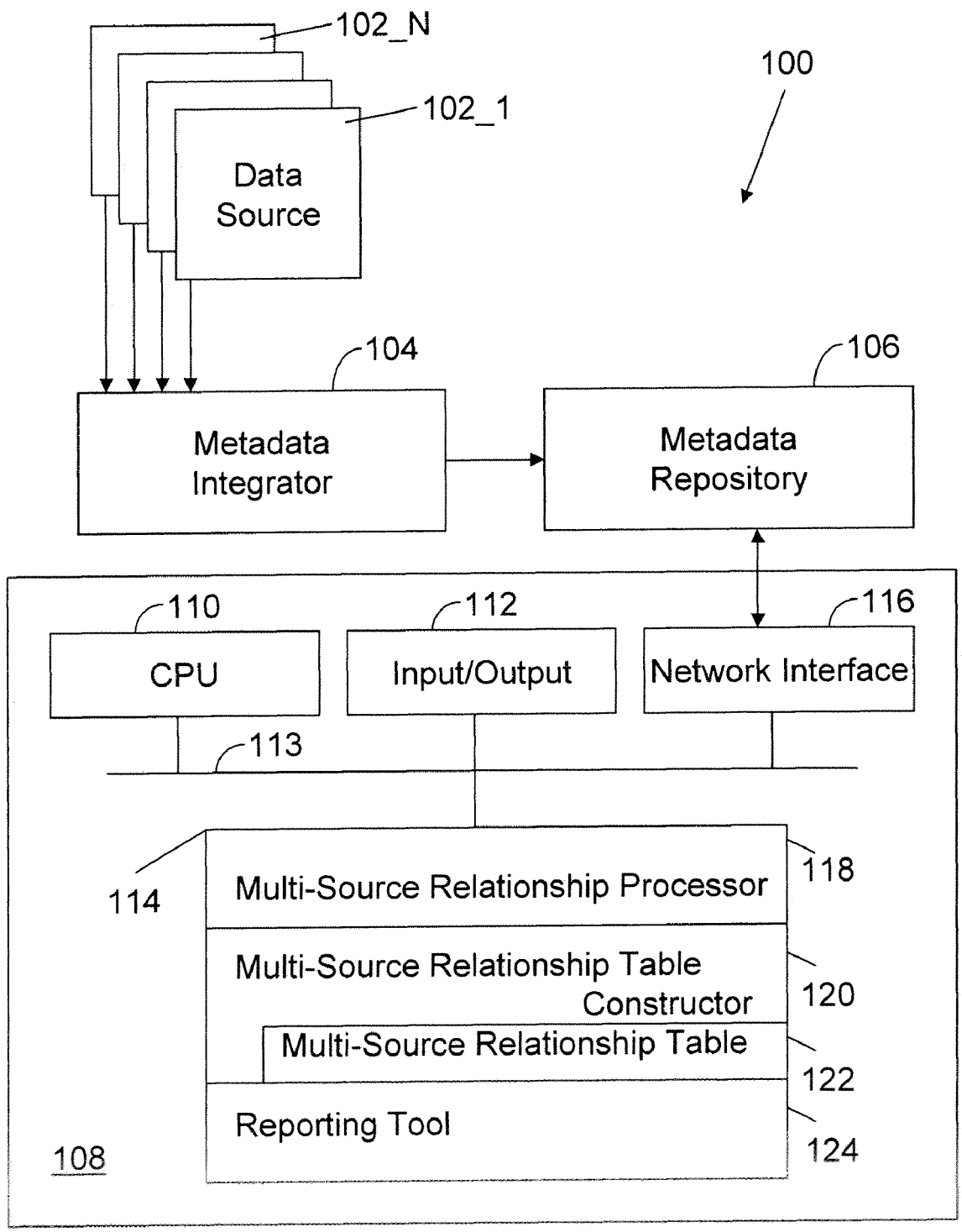
FIG. 1 illustrates a system configured in accordance with an embodiment of the invention.

FIG. 1 illustrates a system 100 configured in accordance with an embodiment of the invention. The system 100 includes a set of data sources 102_1 through 102_N. By way of example, the data sources may include databases (e.g., relational databases and Online Analytical Processing (OLAP) databases), modeling tools, ETL tools, Business Intelligence (BI) tools, and the like. A metadata integrator 104 coordinates the retrieval and delivery of metadata from the disparate data sources 102 to a metadata repository 106. The metadata integrator 104 may be the commercially available Metadata Integrator from Business Objects Americas, San Jose, Calif. The architecture of an exemplary metadata integrator 104 is disclosed in U.S. Provisional Patent Application Ser. No. 60/795,689, entitled "Apparatus and Method for Merging metadata within a Repository", filed Apr. 28, 2006, the contents of which are incorporated herein by reference.

FIG. 1 also illustrates a computer 108 to coordinate the processing of the information in the metadata repository 106. The computer 108 includes standard components, such as a central processing unit 110 and a set of input and output devices 112 connected via a bus 113. The input and output devices 112 may include a keyboard, mouse, touch display, monitor, printer, and the like. Also connected to the bus 113 is a network interface circuit 116, which provides connectivity to the metadata repository 106. The metadata repository 106 may also be resident on computer 108.

A memory 114 is also connected to the bus 113. The memory 114 includes executable instructions to implement operations associated with embodiments of the invention. A multi-source relationship processor 118 includes executable instructions to identify relationships between objects, particularly objects from different data sources. As discussed below, the multi-source relationship processor 118 processes a set of relationship rules to identify relationships between objects.

The memory 114 also stores a multi-source relationship table constructor 120. The multi-source relationship table constructor 120 includes executable instructions to process relationships between objects into a flat structure contained in a table, resulting in a multi-source relationship table 122. Once this information is in a table, a standard reporting tool 124 may be used to generate analyses of the multi-source data. Thus, an aspect of the invention is to transform metadata information about objects found in multiple data sources into a single repository (i.e., table) to facilitate the use of known tools (e.g., a reporting tool) to analyze the information in the single repository.

Figure 2:
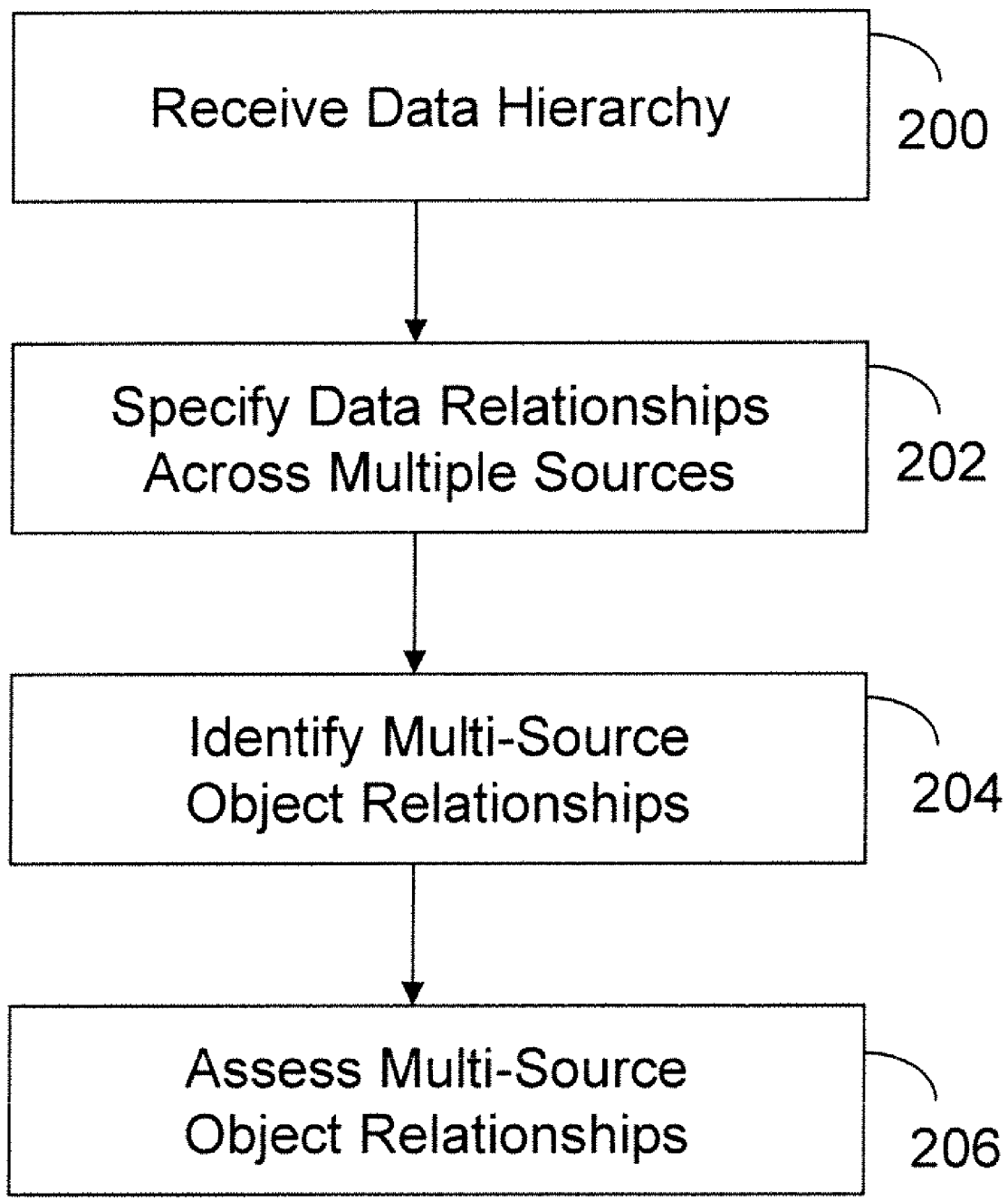
FIG. 2 illustrates relationship processing performed in accordance with an embodiment of the invention.

FIG. 2 illustrates processing operations associated with an embodiment of the multi-source relationship processor 118. The multi-source relationship processor 118 receives a data hierarchy 200. The data hierarchy is used to uniquely identify an object in a metadata repository 106. Thus, for example, the data hierarchy may be in the form of a file hierarchy, an Extensible Markup Language (XML) hierarchy, or a database hierarchy. Regardless of implementation, some type of hierarchical structure is used to identify equivalent objects in different data sources.

Consider the example of the following data hierarchy, which characterizes a database hierarchy:

```
I.   Database
  II.   Catalog
     III.   Schema
        IV.   Table
           V.   Columns
```

The foregoing schema uses five (I through V) hierarchical levels to characterize individual objects. This hierarchy or a similar hierarchy may be used to identify common objects across different data sources.

Next, data relationships across multiple sources are specified 202. FIG. 3 provides an example of rules used to equate hierarchical objects in different data sources. Executable instructions associated with these rules form a portion of the multi-source relationship processor 118.

Each row of the table of FIG. 3 equates an object of a first system with an object of a second system. In this example, objects are equated using four levels of a data hierarchy: context, database, catalog, and schema. Thus, the object specified on the left-hand side of the = sign is equivalent to the object specified on the right-hand side of the = sign. Rules of this type may be generated automatically (i.e., generated code) or manually. In the table, an asterisk (*) denotes that a corresponding element on each side of the = sign should match. Thus, for example, in the first row, since there is an asterisk (*) associated with database, the specified database should be the same on the left-hand side and the right-hand side.

The rules illustrated in FIG. 3 address a number of issues. First, sometimes metadata sources store metadata in normalized form and thereby omit case sensitivity. The invention allows one to address case sensitive issues. Another issue is that various metadata sources store partial or incomplete specifications of metadata and/or refer to the source of their metadata with different names. For example, to connect to an Oracle® database via a thick client, aliases or connection names are used. The same database can be referred to by different names. Incomplete, partial and inconsistent metadata element specification creates major obstacles in establishing relationships across systems. The invention provides a way to specify rules to address this problem.

To resolve the case sensitivity issue, the relationship processor 118 preferably includes executable instructions to process case sensitive or insensitive user input. To address the issue of an incomplete metadata specification, the relationship processor 118 includes executable instructions to take the highest level of the hierarchy available across all systems as an input. For example, a user may specify that he wants to compare relational objects at a schema level. In this way, even if the metadata sources provide incomplete metadata, one can still find common elements. To resolve the issue of different names for the same system, the relationship processor 118 supports the specification of rules to compare metadata elements.

Returning to FIG. 3, each rule or row has a context type left-hand side (LHS) rule and right-hand side (RHS) rule. Each LHS and RHS has context, database catalog and schema fields. The possible values of the context depends on the context type. Context type provides the context under which a rule should be applied. For example, if the context type is a relational database management system, then the possible values of the context fields in the LHS and the RHS are the possible relational database management systems. A rule is applied if and only if context between the rule and the metadata elements match. For example, the first row of FIG. 3 indicates that the context is a specific type of database, namely, a MS SQL database. The second row of FIG. 3 indicates that the context is a Business Intelligence (BI) source and an ETL source. Thus, one relational object belongs to a BI source and the other belongs to an ETL system. The second row also indicates that the different databases BIDB and ETLDB are equivalent. The third row of FIG. 3 specifies a rule that is applied between all relational objects, irrespective of source systems and databases. For this rule, a BOMM catalog value is equated with a DI catalog value.

The multi-source relationship processor 118 includes executable instructions to equate metadata elements with different names. For example, the first row of FIG. 3 suggests that a relational object with MS SQL as a context with the schema name dbo is the same as schema sa, provided other specifications, like catalog and database match (as specified with the asterisks *). Each rule is applied in combination with other rules. For example, the rule of the first row of FIG. 3 may be expressed as *.*.dbo=*.*.sa.

Consider two relational objects db.BI.dbo and db.ETL.sa. These two objects are different because their catalog values do not match (i.e., BI vs. ETL). However, a rule, such as, *.BI.*=.ETL.*, may specify that two objects with the same database name and schema but different catalog names (BI vs. ETL) are still equivalent. In this event, the objects db.BI.dbo and db.ET.sa are the same.

Once a set of rules, such as those set forth in FIG. 3 are established, it is possible to identify multi-source object relationships 204, which is the next operation of FIG. 2. For example, the multi-source relationship processor 118 may identify multi-source object relationships by applying an input object to a set of rules, such as those set forth in FIG. 3, to identify object relationships and equivalent objects. The multi-source object relationships may then be assessed 206. For example, the multi-source object relationships may be presented on a display associated with an output device 112. In addition, the multi-source object relationships may be used to form a list of related objects, which may be used to assess the similarities between different data sources.

The identification of multiple source object relationships associated with the multi-source relationship processor 118 may be further utilized to assess object impact and lineage, subsequently referred to solely as lineage for convenience. A metadata integrator 104 typically identifies links between different objects, for example, the metadata integrator 104 may identify that a first object impacts a second object, which impacts a third object (i.e., 1→2→3). The lineage information provided by the metadata integrator 104 is available in the metadata repository 106. The multi-source relationship table constructor 120 utilizes executable instructions to assess this lineage information using standard technique. In accordance with an embodiment of the invention, the multi-source relationship table constructor 120 expands upon this lineage information by utilizing multi-source relationship information to identify additional lineage information. This additional lineage information is then flattened into a multi-source relationship table 122, which facilitates analysis with a reporting tool 124. These operations are disclosed in connection with FIG. 4.

Figure 4:
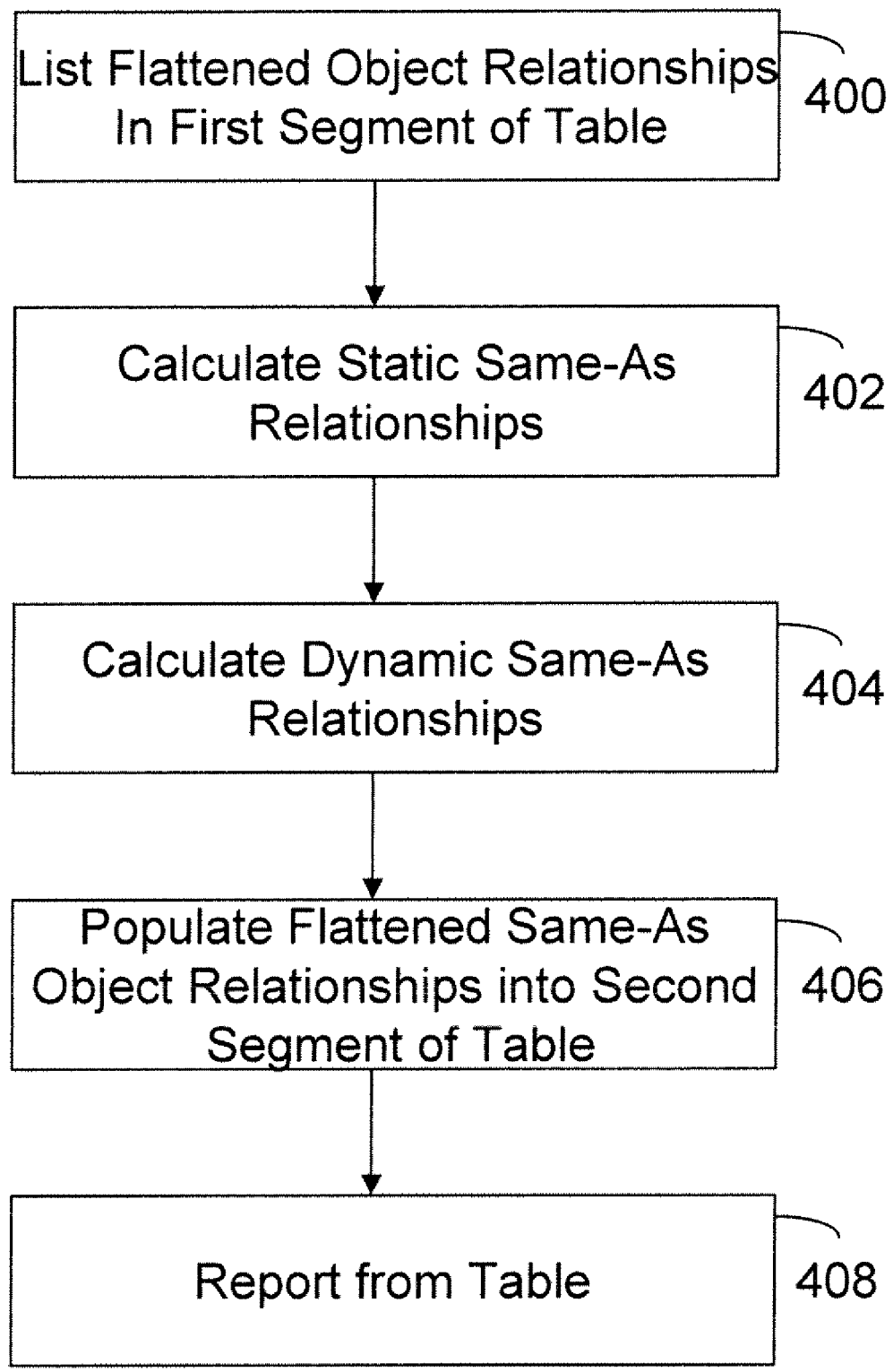
FIG. 4 illustrates impact and lineage processing associated with an embodiment of the invention.
Figure 5:
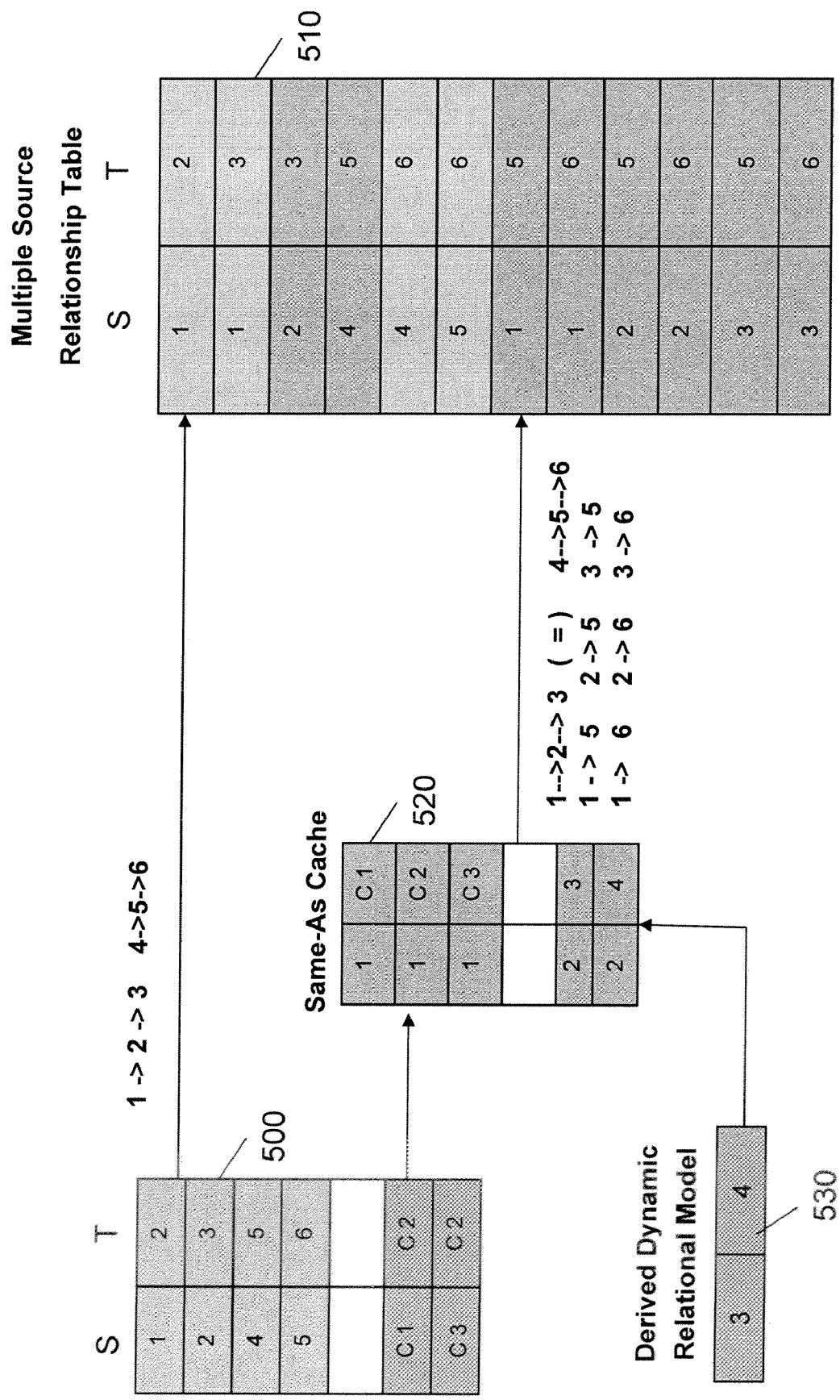
FIG. 5 illustrates an example of impact and lineage processing associated with an embodiment of the invention.

FIG. 4 illustrates processing operations associated with a multi-source relationship table constructor 120. Initially, flattened object relationships are listed in a first segment of a table 400. Consider the example of FIG. 5. FIG. 5 provides an example for a five object system, with objects listed as 1 through 5. Initially, it is known that object 1 impacts object 2, which impacts object 3 (i.e., 1→2→3). It is also known that object 4 impacts object 5, which impacts object 6 (i.e., 4→5→6). Such a relationship can be expressed as shown in table 500. In this example, the left-hand column lists a source (S) and the right-hand column lists a target (T). Thus, the table shows a source-target relationship of 1 to 2, 2 to 3, 4 to 5, and 5 to 6. What this table fails to show are intermediate links, which are supplied in the flattened table 510. The first of table 510 expresses the relationship between object 1 and object 2, as was the case in table 500. The next row indicates that there is also a link between object 1 object 2 (through object 2). Thus, the second rows provides a flattened relationship between object 1 and object 3 that is not available in table 500. The next two rows in table 510 are consistent with the information in table 500. However, the fifth row provides a flattened relationship between object 4 and object 6 (through object 5), which is not available in table 500. The sixth row of table 510 lists the relationship between object 5 and object 6, which as also available in table 500. In sum, the first four entries of table 500 have been flattened into the first six entries in table 510, including new flattened relationships expressed in rows 2 and 5 of table 510.

This flattening allows a reporting tool to query data more easily. For example, a reporting tool can write a query to find all objects which are impacted by object 1 and vice-versa. In one embodiment, this flattening process is applied to metadata associated with a single data source. In other words, initially, each data source is treated separately and independently.

Returning to FIG. 4, the next processing operation is to calculate static same-as relationships 402. More particularly, static same-as relationships are calculated across different metadata sources (i.e., metadata associated with different data sources). These are called static relationships because they are hard-wired, meaning they do not change, for example, due to user preferences.

In one embodiment of the invention, a same-as cache 520 is created. Assume, for example, that the multi-source relationship processor 118 is used to identify that object C1 is the same as object C2 (i.e., C1=C2) and object C3 is the same as object C2 (i.e., C2=C3). These static same-as relationships are loaded into table 500. In particular, row 6 of table 500 equates object C1 and object C2, while row 7 equates object C3 and object C2. Observe that these relationships are symmetric (i.e., if X=Y, then Y=X) and transitive (i.e., if X=Y and Y=Z, then X=Y=Z). The multi-source relationship table constructor 120 includes executable instructions to identify this situation and conclude that objects C1, C2 and C3 are all the same. The table constructor 120 further includes instructions to flatten this information into same as cache 520. For example, this may be done by assigning a single index value (i.e., 1) to each object (i.e., to C1, C2, and C3), as shown in table 520.

The next operation of FIG. 4 is to calculate dynamic same-as relationships 404. More particularly, this operation entails calculating dynamic same-as relationships across different metadata sources, for example, using the multi-source relationship processor 118. The same-as relationships may be specified by user preferences, user defined rules, and static same-as relationships. The previously calculated static same-as relationships are used in this operation. Relying upon the data hierarchy example provided above, an embodiment of the invention executes same-as relationships at the database, catalog, schema, table and column levels. Execution may be contingent upon user preferences. For example, if the comparison level is at the schema level, levels above schema (i.e., database and catalog) may be disregarded.

In one embodiment, user preferences along with user defined rules are converted into SQL queries and are passed to a database stored procedure, which in turn executes the query and populates the same-as cache. Consider the following example with given user preferences.
(1) Static SAME-AS relationship: Catalog1=Catalog2
(2) Comparison rule: Case insensitive
(3) Comparison level: Catalog
(4) Rules:
   *.*.shc1=*.*.sch2

The above preferences are encoded or converted into SQL queries. The exemplary queries below are pseudo queries.

A dynamic same-as query for a database is not necessary because the comparison level is Catalog. A query to calculate dynamic same-as for the catalog level may be as follows. In particular, this query finds the rows which have the same catalog name case insensitivity.

```
select <required_columns>
from
MMRV_Relational_Model L, MMRV_Relational_Model R
where Upper (L.catalog_name) = Upper (R.catalog_name) [Equivalent
pseudo SQL for (2)]
```

A query for dynamic same-as schema may be constructed to find the rows which have the same corresponding schema name and catalog name:

```
select <required_columns>
from
MMRV_Relational_Model L, MMRV_Relational_Model R
where (
    Upper (L.schema_name) = Upper (R.schema_name) [Equivalent
pseudo SQL for (2)]
    OR
    Upper(L.schema_name) IN ('SCH1', 'SCH2') AND
    Upper(R.schema_name) IN
    ('SCH1', 'SCH2')
    [Equivalent pseudo SQL for (2) and (4)]
    )
AND ( L.catalog_id and R.catalog_id has same SAME_AS index)
[Equivalent pseudo SQL for (1)]
```

A dynamic same-as table query may be constructed as follows:

```
select <required_columns>
from
MMRV_Relational_Model L, MMRV_Relational_Model R
where Upper (L.table_name) = Upper (R.table_name) [Equivalent
pseudo SQL for (2)]
AND ( L.schema_id and R.schema_id has same SAME_AS index)
[Equivalent pseudo SQL for (1)]
```

A dynamic same-as column query may be constructed as follows:

```
select <required_columns>
from
MMRV_Relational_Model L, MMRV_Relational_Model R
where Upper (L.column_name) = Upper (R. column_name) [Equivalent
pseudo SQL for (2)]
AND ( L.table_id and R.table_id has same SAME_AS index)
[Equivalent pseudo SQL for (1)]
```

Suppose that the foregoing queries establish that object 3 is equivalent to object 4. This relationship is shown in table 530 of FIG. 5. Since objects 3 and 4 are equivalent, they are assigned a common index (2) and are loaded into the same-as cache 520, as shown in FIG. 5.

Returning to FIG. 4, the next operation is to use the flattened same-as object relationships to populate a second segment of the flattened table 406. In other words, the information from the same-as cache 520 is used to flatten information derived from the same-as analysis. Since objects 3 and 4 are now known to be equivalent, there is a link between the sequence 1→2→3 and 4→5→6. This link is flattened to establish the lineage 1→5, 1→6, 2→5, 2→6, 3→5, and 3→6. These flattened relationships are loaded into the table 510, as shown in FIG. 5. At this point, the table 510 holds all of the flattened relationships derived from the original relationships, the static same-as relationships, and the dynamic same-as relationships across multiple metadata sources. The table 510 now provides information that may be easily queried and reported using a reporting tool 124. Thus, the final operation shown in FIG. 4 is to report from the table 408. For example, data impact and lineage reports may be generated using the reporting tool 124.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, may modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:

access metadata objects in a metadata repository, wherein each metadata object has an identity defined by a hierarchical structure;

list flattened single data source metadata object relationships in a first segment of a multiple data source relationship table, wherein the flattened single data source object relationships specify direct and intermediate links between metadata objects in a single data source;

calculate same-as multiple data source metadata object relationships, wherein a same-as multiple data source metadata object relationship identifies equivalent metadata objects based upon a common hierarchical structure;

populate flattened same-as multiple data source metadata object relationships in a second segment of the multiple data source relationship table, wherein the flattened same-as multiple data source object relationships specify direct and intermediate links between metadata objects in multiple data sources; and report data lineage information from the multiple data source relationship table.

2. The computer readable storage medium of claim 1 wherein the executable instructions to calculate same-as multiple data source metadata object relationships include executable instructions to calculate static same-as multiple data source metadata object relationships.

3. The computer readable storage medium of claim 1 wherein the executable instructions to calculate same-as multiple data source metadata object relationships include executable instructions to calculate dynamic same-as multiple data source metadata object relationships.

4. The computer readable storage medium of claim 1 wherein the executable instructions to calculate same-as multiple data source metadata object relationships include executable instructions to identify same-as metadata objects with symmetric properties.

5. The computer readable storage medium of claim 1 wherein the executable instructions to calculate same-as multiple data source metadata object relationships include executable instructions to identify same-as metadata objects with transitive properties.

6. The computer readable storage medium of claim 1 wherein the executable instructions to calculate same-as multiple data source metadata object relationships include executable instructions to specify SQL queries.

7. The computer readable storage medium of claim 1 further comprising executable instructions to store the same-as multiple data source metadata object relationships in a cache.

8. The computer readable storage medium of claim 7 further comprising executable instructions to assign a common cache index value to common metadata objects.

9. The computer readable storage medium of claim 1 further comprising executable instructions to report data impact information from the multiple data source relationship table.

10. The computer readable storage medium of claim 1 further comprising executable instructions to specify data relationships between at least two data sources selected from a relational database, an Online Analytical Processing (OLAP) database, a modeling tool, an Extraction Transform Load (ETL) tool, and a Business Intelligence (BI) tool.

11. The computer readable storage medium of claim 1 wherein the hierarchical structure is selected from a file hierarchy, an Extensible Markup Language (XML) hierarchy, and a database hierarchy.

* * * * *